(12) United States Patent
Chen et al.

(10) Patent No.: US 11,969,643 B2
(45) Date of Patent: Apr. 30, 2024

(54) EXERCISE APPARATUS WITH AN IMAGE DISPLAY

(71) Applicant: Johnson Health Tech. Co., Ltd., Taichung (TW)

(72) Inventors: Joe Chen, Taichung (TW); Hung-Mao Liao, Taichung (TW)

(73) Assignee: Johnson Health Tech Co., Ltd., Taichung (TW)

( * ) Notice: Subject to any disclaimer, the term of this patent is extended or adjusted under 35 U.S.C. 154(b) by 148 days.

(21) Appl. No.: 17/751,701

(22) Filed: May 24, 2022

(65) Prior Publication Data
US 2022/0379190 A1 Dec. 1, 2022

(30) Foreign Application Priority Data
May 31, 2021 (CN) ......................... 202121189207.X

(51) Int. Cl.
*A63B 71/06* (2006.01)
*A63B 22/02* (2006.01)
*A63B 22/06* (2006.01)

(52) U.S. Cl.
CPC .......... *A63B 71/0622* (2013.01); *A63B 22/02* (2013.01); *A63B 22/0605* (2013.01); *A63B 2071/0658* (2013.01); *A63B 2225/09* (2013.01)

(58) Field of Classification Search
CPC . A63B 71/0622; A63B 22/02; A63B 22/0605; A63B 2071/0658; A63B 2225/09; F16M 2200/06; F16M 11/10; F16M 11/2014; F16M 11/2028; F16M 11/2085; F16M 11/24; F16M 13/02
See application file for complete search history.

(56) References Cited

U.S. PATENT DOCUMENTS

| 7,445,583 | B2 * | 11/2008 | Chen | A63B 71/0622 D8/380 |
| 2008/0093517 | A1 * | 4/2008 | Chen | A63B 22/0605 482/57 |
| 2010/0077564 | A1 * | 4/2010 | Saier | A63B 22/0605 16/242 |
| 2018/0169476 | A1 * | 6/2018 | Shimada | A63B 24/0059 |
| 2022/0016511 | A1 * | 1/2022 | Rozo | A63B 71/0622 |
| 2022/0062736 | A1 * | 3/2022 | Farrell | F16M 11/10 |

(Continued)

*Primary Examiner* — Garrett K Atkinson

(57) ABSTRACT

An exercise apparatus comprises an exercise apparatus body and an image display connected to a front portion of a frame of the exercise apparatus body. The image display can be moved between a first position and at least one second position via a connecting component. When the image display is located at the first position, a display surface of the image display basically faces substantially rearward, and the center point of the display surface is located in the region of the width in the transverse direction of the exercise apparatus body for a user viewing an image to perform a first exercise by using the exercise apparatus in a first exercise area; and when the image display device is located at the second position, the display surface faces substantially rearward, and the center point of the display surface is located outside the region of the width in the transverse direction of the exercise apparatus body for a user viewing the image to perform a second exercise in a second exercise area which is outside the first exercise area.

10 Claims, 16 Drawing Sheets

(56) References Cited

U.S. PATENT DOCUMENTS

| | | | |
|---|---|---|---|
| 2022/0241665 A1* | 8/2022 | Dalebout | A63B 71/0036 |
| 2022/0339504 A1* | 10/2022 | Intonato | G16H 40/67 |
| 2023/0026251 A1* | 1/2023 | Tracy | F16M 11/043 |
| 2023/0181993 A1* | 6/2023 | Taylor | A63B 22/02 482/1 |

* cited by examiner

EXERCISE APPARATUS WITH AN IMAGE DISPLAY

BACKGROUND

1. Field of the Invention

The present invention relates to an exercise apparatus. More particularly, the present invention relates to an exercise apparatus with an image display.

2. Description of the Related Art

Guiding a user to perform fitness exercise with exercise class videos at home is becoming more and more popular in these days, for example, lots of exercise bikes or treadmills are equipped with video displays to receive streaming content via internet for displaying exercise class videos corresponding to exercise apparatus types (for example, for the user of a stationary exercise bicycle, the streaming content might be exercise class videos including an instructor riding a stationary exercise bicycle, or a road bike on an outdoor road to guide the user performing cycling exercise), the user can follow instructions in the exercise class videos to perform exercise. The content of the exercise class videos may also include various exercise types such as stretching, yoga, light weight training, etc., so the user can follow the exercise class videos to perform those exercises in a suitable area around the exercise apparatus.

FIG. 1 shows an exercise bike 1 having an image display 2 at the front portion of its frame, the image display 2 being able to horizontally rotate about a vertical axis A to change the facing direction of the display surface 3. Referring to FIG. 2, the image display 2 of the exercise bike 1 is located at its normal position shown as solid line with the display surface 3 facing rearward toward the user of the bike 1, so that the user can face toward the display surface 3 while riding the exercise bike 1 in the first exercise area S1 formed by exercise bike 1. If the user wants to follow exercise class videos displayed by the display surface 3 to perform different exercises such as stretching, yoga, light weight training (hereinafter referred to as second exercise), the user can horizontally rotate the image display 2 from a normal position to a different angular position (for example, the image display 2 shown in solid line may be rotated 90 degrees to the right, or may be rotated 45 degrees to the right), so that the display surface 3 faces a different area and the user can perform the second exercise while viewing images displayed on the display surface 3 while the user is physically located in a second exercise area (for example, S2 or S2' in FIG. 2).

In practice, the user might perform the second exercise on the floor, usually with a yoga mat on the floor surface. The area of S2 or S2' in FIG. 2 is illustrated as a rectangular space corresponding to the dimension of the yoga mat (usually 61 by 183 cm). The longitudinal direction of the rectangular space (corresponding to the length direction of the body of the user performing sit-up in the area S2 or S2' in FIG. 2) corresponds to the front-back direction of the exercise bike 1, so that the user can face to the image display 2 while performing the second exercise. The second exercise area S2 and S2' only indicate an approximate position and range, and when the user performs the second exercise, the user body might exceed the rectangular space.

When the user horizontally rotates the image display 2 about 90 degrees from the normal position, the facing direction of the display surface 3 rotates to left or right. The user then needs to change his or her position to the left side or the right side of the exercise bike 1 to face to the image display 2 to perform the second exercise in the second exercise area S2. The user can view the display surface 3 completely and operate the image display 2 without being hindered by the exercise bike 1 (for example, the user adjusts the pitch angle and input commands by pressing button or touch screen). However, the occupied area of the exercise bike 1 and the second exercise area S2 is similar to an L shape, and the area surrounding the exercise bike 1 (for example, the right side or the left side of the exercise bike 1 in FIG. 2) must leave a space between the exercise bike 1 and the second exercise area S2 for the user to walk. Therefore, the total usage space for exercising is large and there is a higher space requirement for locating the exercise bike 1 to allow it to be used for both a first exercise and a second exercise. If the indoor space for placing the exercise bike 1 is small, the user can only horizontally rotate the image display 2 about 45 degrees from the normal position to allow the user to perform the second exercise at a second location next to the exercise bike 1. The user faces the image display 2, which is corresponding to the oblique rear side of the exercise bike 1, and performs the second exercise in the second exercise area S2'. Although total usage space for exercising might become smaller, the handle 4 of the exercise bike 1 is located between the second exercise area S2' and the image display 2, possibly causing inconvenience in operating the image display 2. Moreover, when the user performs the second exercise on the floor and views the display surface 3 obliquely from a relatively low position to an upper position, the front structure (e.g., the handle 4) of the exercise bike 1 shields the display surface 3, which prevents the user from viewing the complete image.

Some exercise apparatuses may be equipped with non-rotatable image display, and in this scenario, the user would typically be facing forward to perform the second exercise on an exercise area S2" which is adjacent to the exercise bike 1, and the longitudinal direction of the exercise area S2" is generally parallel to the longitudinal direction of the exercise bike 1. Although total usage space for exercising is small, the exercise bike 1 might shield the display surface 3 causing the user performing floor exercise type to be unable to view the complete image. Further, because the display surface 3 is relatively positioned diagonally forward of the long axis direction of the second exercise area S2", the user must angle themselves to view the display surface 3.

A further disadvantage of the above scenario is that the height of the image display and the screen is adapted to the user's line of sight when performing the exercise with a primary exercise apparatus (e.g., exercise bike 1), so when the user performs the second exercise such as floor exercise type in the second exercise area S2, S2' or S2", the user usually needs to look up for viewing the image, which is less comfortable for the user, and this may also interfere with the visibility of the image being presented on the image display 2.

SUMMARY

The present invention provides an exercise apparatus with an image display, with the image display displaying an instructional image to guide a user to perform a first exercise in a first exercise area of the exercise apparatus and a second exercise in a second exercise area adjacent to the exercise apparatus at a different time, wherein the total usage area for the user performing the first exercise and second exercise is small and compact, and thus the space requirement for placing the exercise apparatus is low.

It is another object of the present invention to provide an exercise apparatus that allows the user to face forward to view the instructional image without turning sideways when the user performs the second exercise in the second exercise area, so that the user can watch the instructional image comfortably.

It is another object of the present invention to provide an exercise apparatus that allows a user to view a complete instructional image without their view being blocked by the exercise apparatus when the user performs a second exercise in a second exercise area.

It is another object of the present invention to provide an exercise apparatus that allows a user to operate the image display without being hindered by the exercise apparatus when the user performs a second exercise in a second exercise area.

It is another object of the present invention to provide an exercise apparatus that allows the user to easily and naturally view an instructional image when the user performs a second exercise without bowing or craning the user's head.

The user can adjust the contrast relation of the visibility between an instructor image and a user image to correct the contrast imbalance caused by the ambient brightness. Alternatively, the user can deliberately adjust the imbalance contrast relation so that the user can focus on one relatively eye-catching image (either the displayed image or the reflected image), or preferably, one of the two images can be adjusted to be completely transparent so that the other image can be seen alone.

The present invention provides an exercise apparatus that includes an exercise apparatus body having a frame and a moving mechanism movably arranged on the frame, the exercise apparatus defines a transverse (left-right) direction and a longitudinal (front-back) direction for a user facing forward to perform a first exercise by using the moving mechanism in a first exercise area which is located within an area of width in the transverse direction and length in the longitudinal direction of the exercise apparatus body. An image display has a display surface for showing a video image, the image display movably connected to a front portion of the frame via a connecting component; and when the display surface is located at a first position, the display surface faces rearward and a center point of the display surface is located in a region of the width in the transverse direction of the exercise apparatus body for the user viewing the video image to perform the first exercise in the first exercise area. A control unit is operatively connected to the image display, the control unit controls content displayed by the image display and the content comprises a first instructional image for guiding the user to perform the first exercise in the first exercise area and a second instructional image for guiding the user to perform a second exercise in a second exercise area which is adjacent to the exercise apparatus body. The image display is operable to be moved between the first position and at least one second position via the connecting component, and the at least one second position is located at a second position that is either to the left side or to the right side of the first position. When the image display is moved from the first position to the at least one second position, the movement distance of the center point in the transverse direction exceeds half of the width in the transverse direction of the exercise apparatus body, and when the image display is located at the at least one second position, the display surface faces rearward and the center point of the display surface is located outside the region of the width in the transverse direction of the exercise apparatus body for the user viewing the video image to perform the second exercise in the second exercise area.

Preferably, when the image display is moved from the first position to the at least one second position, with the second position being positioned on the left side of the image display, the center point of the display surface is located outside the left side edge of exercise apparatus body. When the image display is moved from the first position to the at least one second position, with the second position being positioned on the right side of the image display, the center point of the display surface is located outside the right side edge of exercise apparatus body.

Preferably, when the image display is located at the at least one second position, the entire display surface is located outside the region of the width in the transverse direction of the exercise apparatus body.

Preferably, when the image display is located at the at least one second position, the entire display surface is located outside a region of the width of the display surface when the display surface is located at the first position.

Preferably, the display surface comprises a long axis direction perpendicular to a short axis direction. When the image display is located at the at least one second position, the long axis direction of the display surface corresponds to the transverse direction of the exercise apparatus body, the length of the exercise apparatus body in the longitudinal direction is longer than the width of the exercise apparatus body in the transverse direction, the shape of the second exercise area is a rectangle and the length axis direction of the rectangle is substantially parallel to the longitudinal direction of the exercise apparatus body, and one of the long sides of the rectangle is adjacent to one side of the exercise apparatus body.

Preferably, when the image display is located at the at least one second position, the height of the bottom end of the display surface is lower than the bottom end of the display surface when the display surface is located at the first position.

Preferably, when the image display is located at the at least one second position, the height of the image display is adjustable. When the height of the image display is adjusted to the lowest height, the height of the bottom end of the display surface is lower than the bottom end of the display surface when compared to the location of the display surface when the display surface is located at the first position.

Preferably, when the image display is located at the at least one second position, a pitch angle of the image display is adjustable and a normal line of the display surface may be angled downward from a horizontal plane by at least 5 degrees.

Preferably, the connecting component comprises a rotation shaft and the rotation shaft axis is substantially parallel to the longitudinal direction of the exercise apparatus, and the image display movable between the first position and at least one second position which comprises rotation of the image display by 90 degrees or 180 degrees according to the orientation of the rotation shaft. The control unit orients the video image shown on the image display to substantially compensate for the change in orientation of the image display.

Preferably, the connecting component comprises a vertical tilt axis perpendicular to a horizontal tilt axis, the image display being movable between the first position and the at least one second position. The movement of the image display between the first position and the at least one second position involves rotation of the image display by 180 degrees about the vertical tilt axis and rotation of the image display by 180 degrees about to the horizontal tilt axis, and the control unit orients the video image shown on the image display to substantially compensate for the change in orientation of the image display.

DETAIL DESCRIPTION

Figure 1:
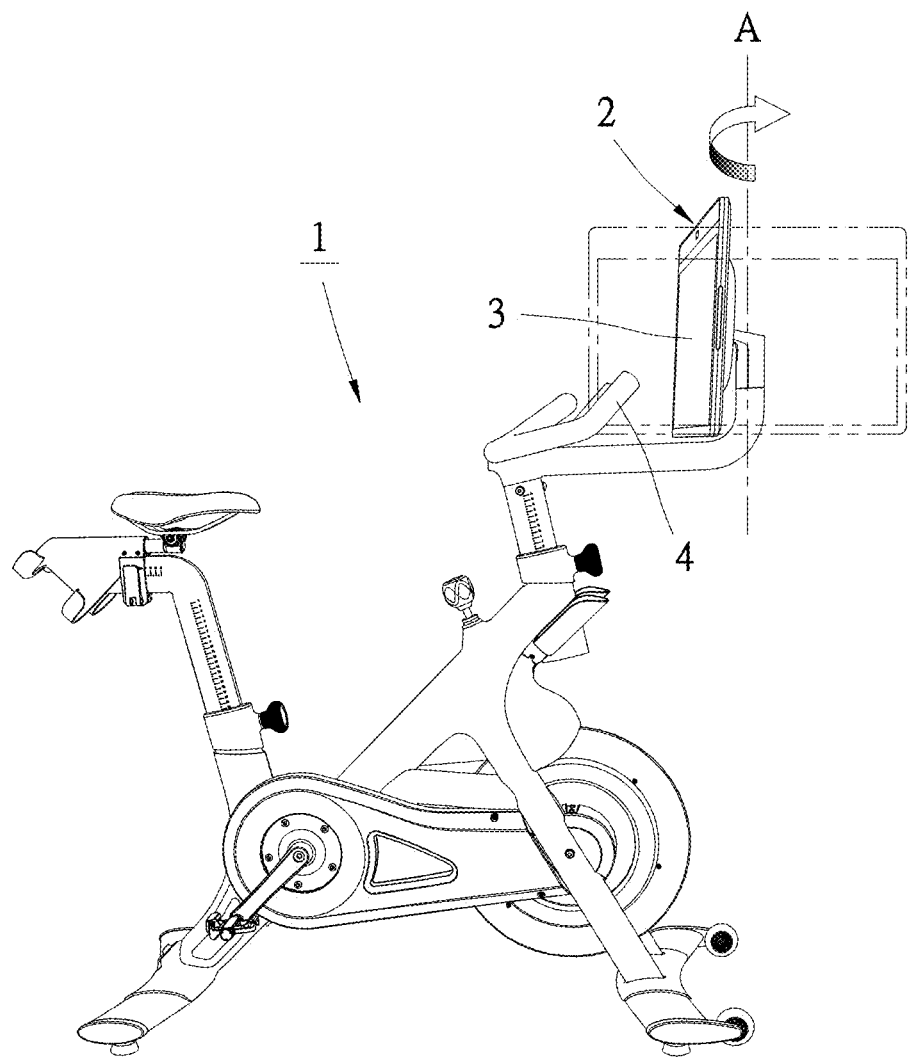
FIG. 1 is a side view of the exercise bike equipped with an image display.
Figure 2:
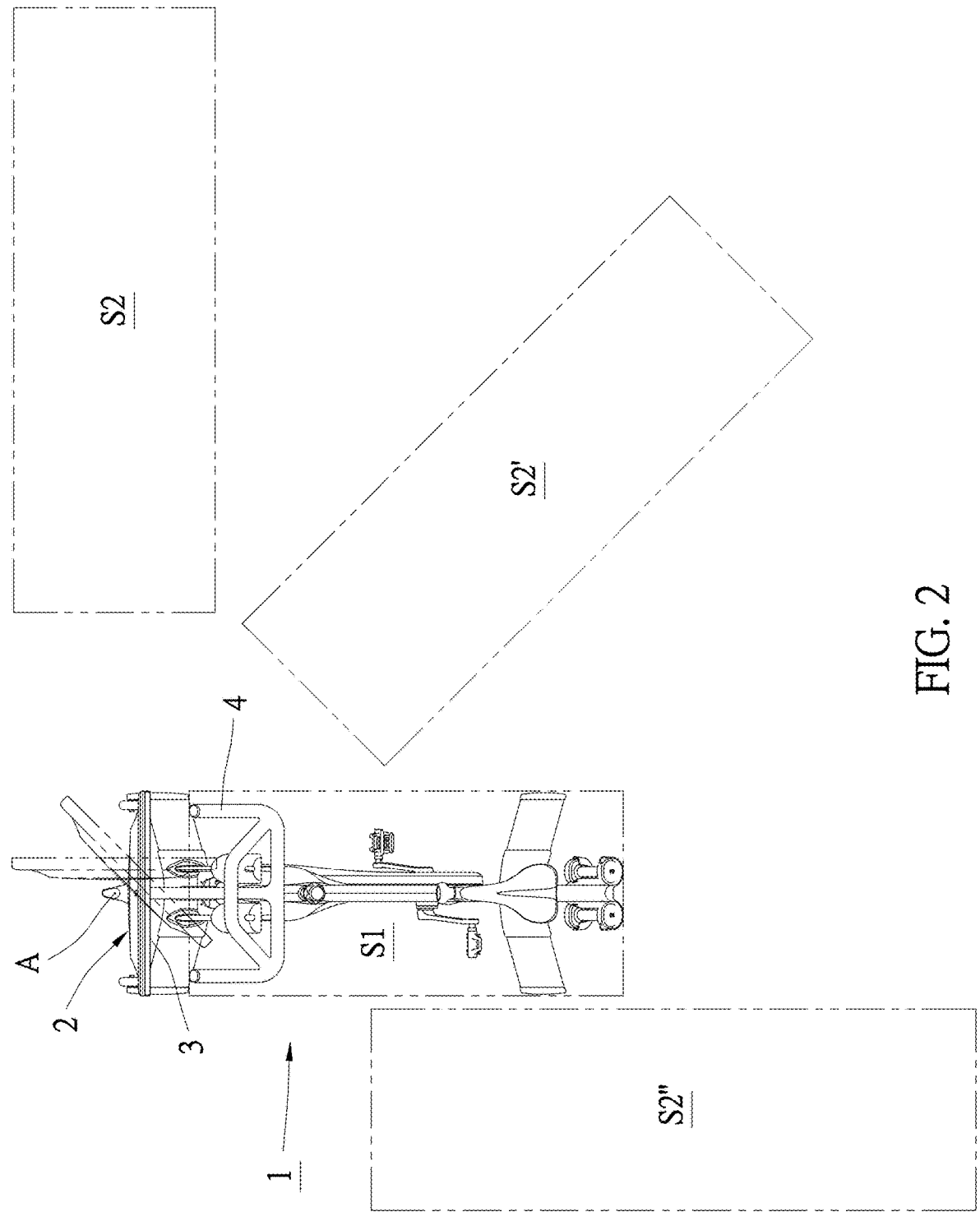
FIG. 2 is a top view of the exercise bike of FIG. 1 showing the positions of a second exercise area.
Figure 3:
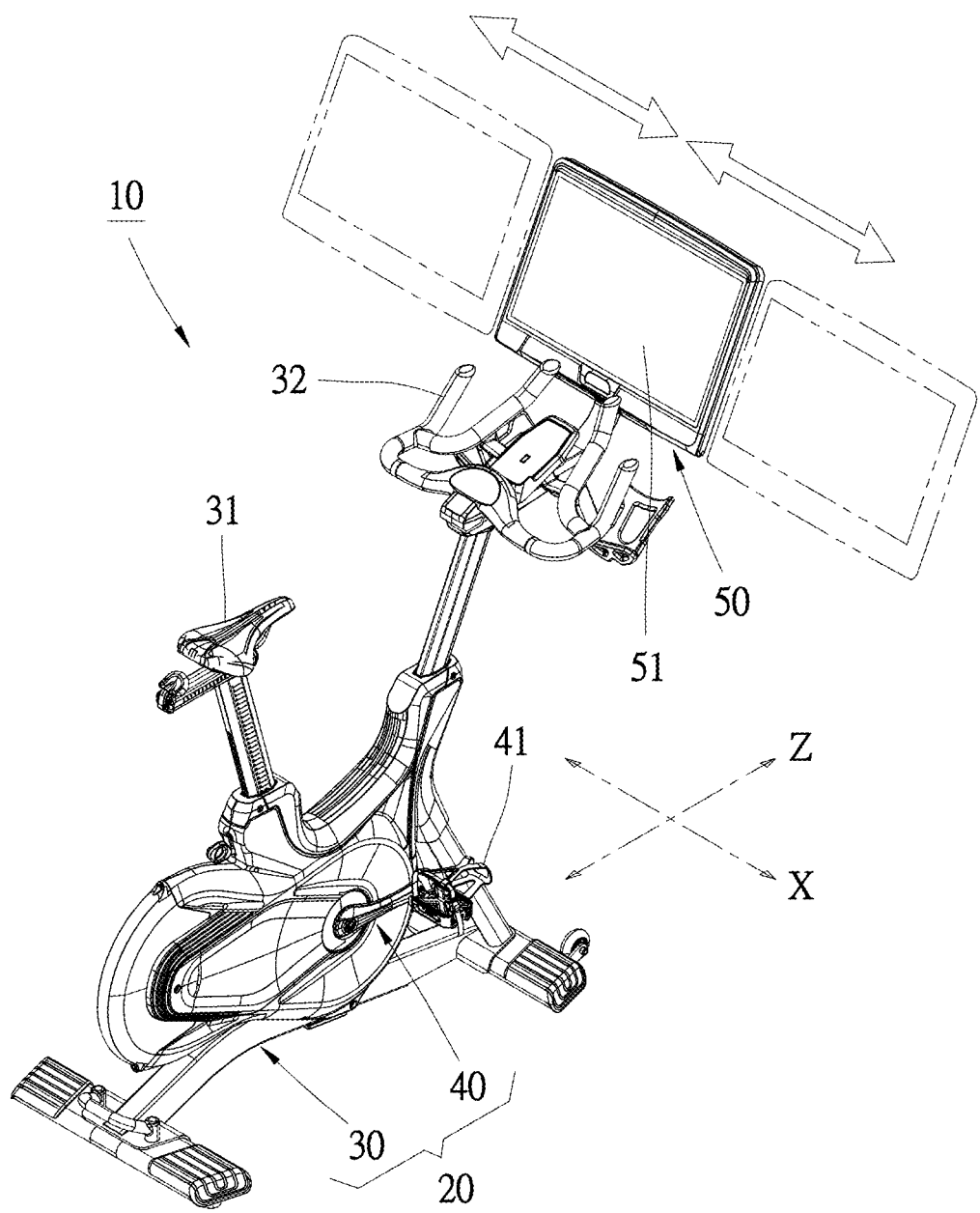
FIG. 3 is a perspective view of the exercise apparatus (exercise bike) of the preferred embodiment of the present invention of the image display being moved between a first position and a second position.

The present invention could apply to various types of exercise apparatus such as exercise bike, treadmill, stepper, stair machine, elliptical trainer, rowing machine, weight trainer, etc. Referring to FIGS. 3 to 7, an exercise apparatus 10 is illustrated in accordance with a preferred embodiment of the present invention, the exercise apparatus 10 (exercise bike) may include an exercise apparatus body 20 (main body of the exercise bike), the exercise apparatus body 20 may include a frame 30 and a moving mechanism 40 which is movably arranged relative to the frame 30 for a user performing a exercise. As an example, the moving mechanism 40 may include a pedal crank mechanism pivotally connected to the frame 30, the user can perform an exercise (hereinafter referred to as a first exercise) of stepping on the pedal crank mechanism to simulate riding a bicycle.

When the user performs the first exercise by using the exercise bike, the user faces forward and sits on the seat 31 of the frame 30 with hands holding the grips 32 at the front end of the frame 30. The user steps on the pedal 41 of the moving mechanism 40 and positions themselves in a first exercise area S1 which is located within a region bounded by a width in the transverse direction and a length in the longitudinal direction of the exercise apparatus body 20. Note that the statement of "performing the first exercise in a first exercise area S1" describes a typical case of using the exercise bike, but in practice, the user's body part might temporary exceed the first exercise area S1, for example, the user's elbow might exceed the width in the transverse direction of the exercise apparatus body 20. The exercise apparatus body 20 defines a transverse direction X (corresponding to the left-right direction of FIG. 6) and a longitudinal direction Z (corresponding to the up-down direction of FIG. 6), the direction X and the direction Z are corresponding to directions of the user when the user sits on the exercise bike, where the facing direction of the user is the direction toward the front of the exercise apparatus body 20, and where the opposite direction of the facing direction is the direction toward the back of the exercise apparatus body 20, and the left hand side and the right hand side of the user respectively corresponds to the left side and the right side of the exercise apparatus body 20.

Figure 4:
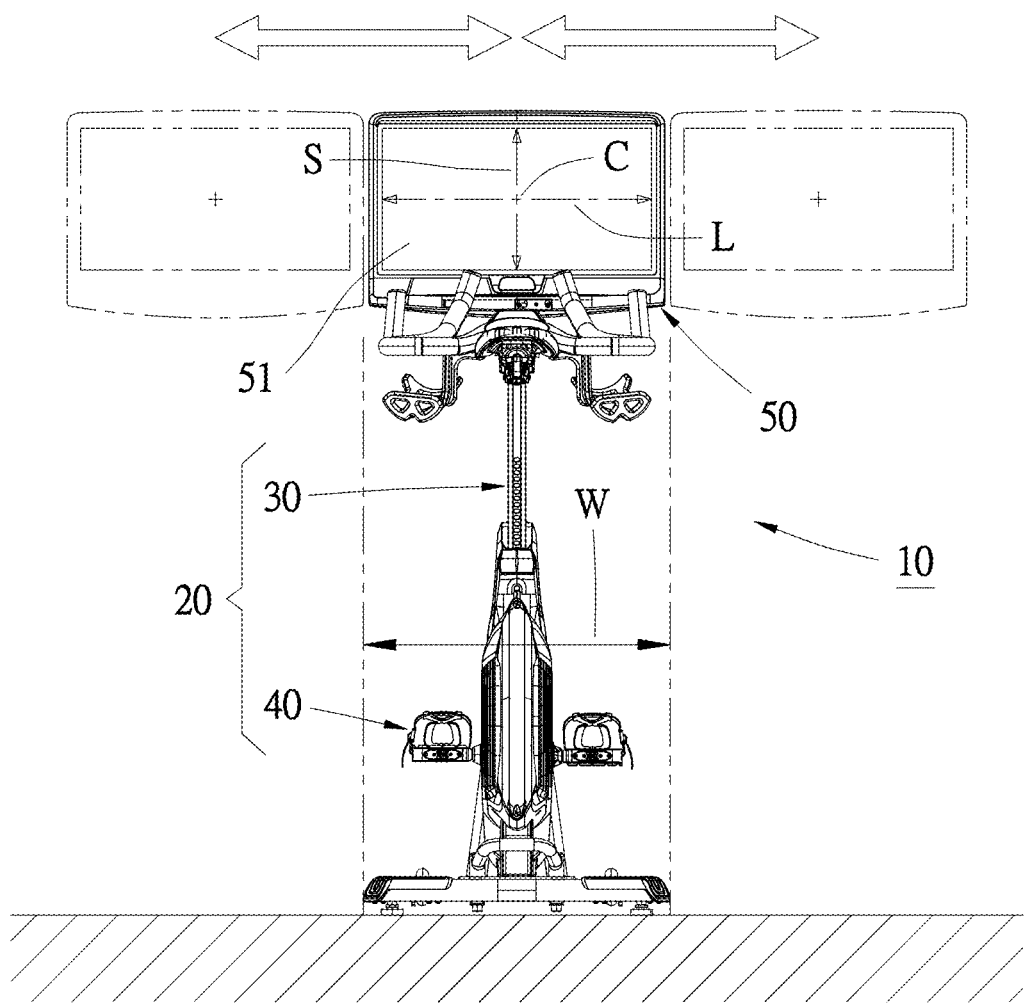
FIG. 4 is a rear view of the exercise bike of FIG. 3.

The exercise apparatus 10 is equipped with an image display 50, the image display 50 is connected to the front portion of the frame 30 via a connecting component 60. The image display 50 includes a display surface 51 such as a liquid crystal display for displaying a video image. As shown in FIG. 4, the shape of the display surface 51 is rectangular and the display surface 51 has a long axis direction L and a short axis direction S perpendicular to each other. The long axis direction L of the display surface 51 is substantially in the transverse direction of the exercise apparatus body 20, and the short axis direction S of the display surface 51 is substantially in the longitudinal direction but is not limited to being perpendicular to the floor surface. The image display 50 might be a wide screen display with ratio of about 16:9, the display surface 51 has a diagonal length of 22 inches (approximately 56 cm) and a longitudinal length L about 49 cm which is substantially equal to the width in the transverse direction W of the exercise apparatus body 20. The bottom of the image display 50 might be equipped with a speaker (not shown) for outputting audio signals and buttons (not shown) for the user to press to insert commands, and the display surface 51 of the image display 50 might be a touch-screen, so that the user can input commands by touching the display surface 51. A control unit (not shown), possibly integrated into the image display 50, is operationally connected to the image display 50, the speaker, the buttons and the touch screen, etc. The control unit can control the content of the image displayed on the display surface 51 and control the content of the audio output by the speaker. And the control unit can also receive, judge, and process the user's instructions from the buttons or the touch screen. In additional, the control unit may receive streaming video data or download complete video data via a local area network or a wide area network by wired or wireless transmission, and/or read the video data from the exercise apparatus or a storage medium (not shown) prepared by the user, and display the content via the image display 50 and the speaker.

Furthermore, the image display 50 in the present embodiment may show various content. The control unit can control the image display 50 to show the content of exercise classes. In the present embodiment, the content may include a first instructional image and a second instructional image, the first instructional image is used to guide the user to perform the first exercise on the exercise apparatus. For example, the first instructional image may include an instructor riding and using an exercise bicycle similar to the one being used by the user, or the instructional image may include an instructor on an outdoor road bike to guide the user performing the exercise. The second instructional image is used to guide the user to perform the second exercise without using the exercise apparatus. For example, the second instructional image might instruct a user in stretching, yoga, light weight training, etc. The user can select different exercise classes based on user preference, and some exercise classes might include a single type of exercise, but other exercise classes might also include multiple exercise types in a sequential combination of the first exercise and the second exercise, such as a stretching exercise (warming exercise) first, then getting on the exercise bike to perform a cycling exercise, and finally getting off the exercise bike to perform a stretching (relaxing or cool-down exercise).

Figure 5A:
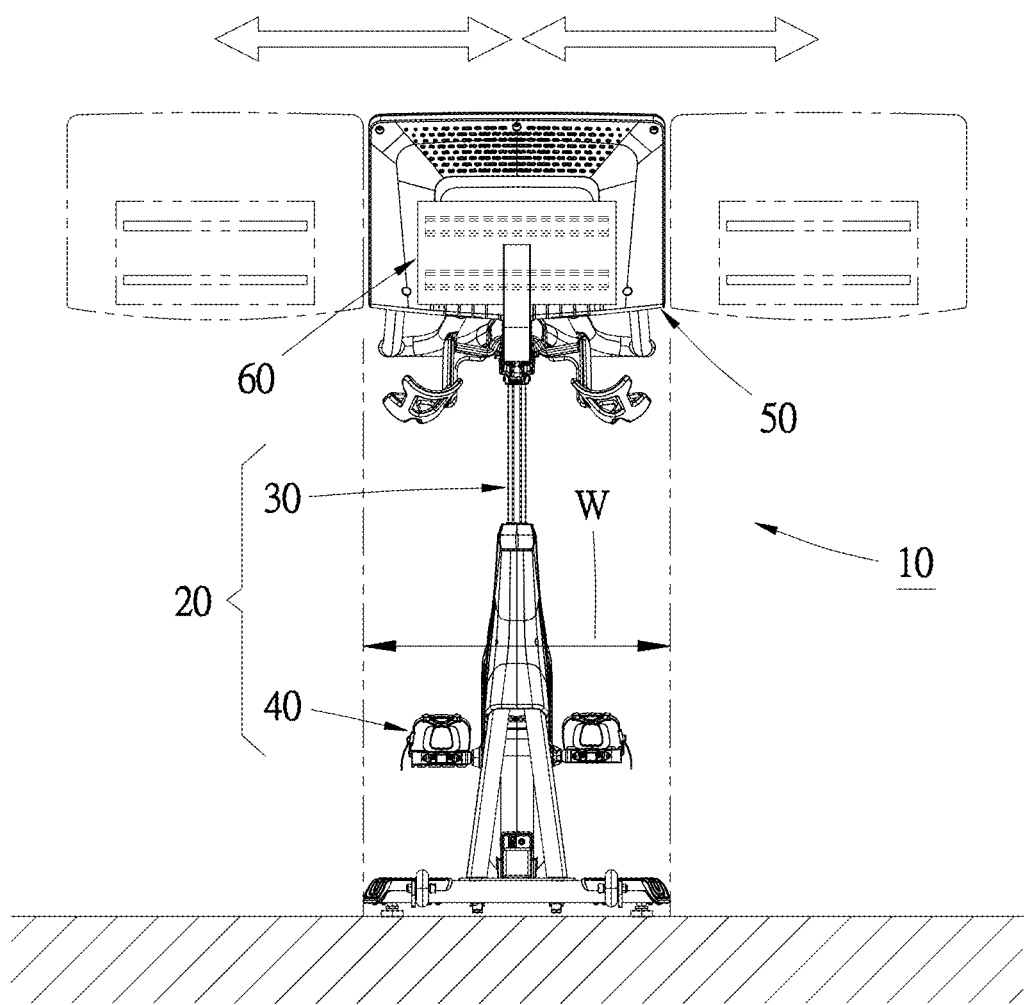
FIG. 5A is a front view of the exercise bike when the image display is located at the first position.
Figure 5B:
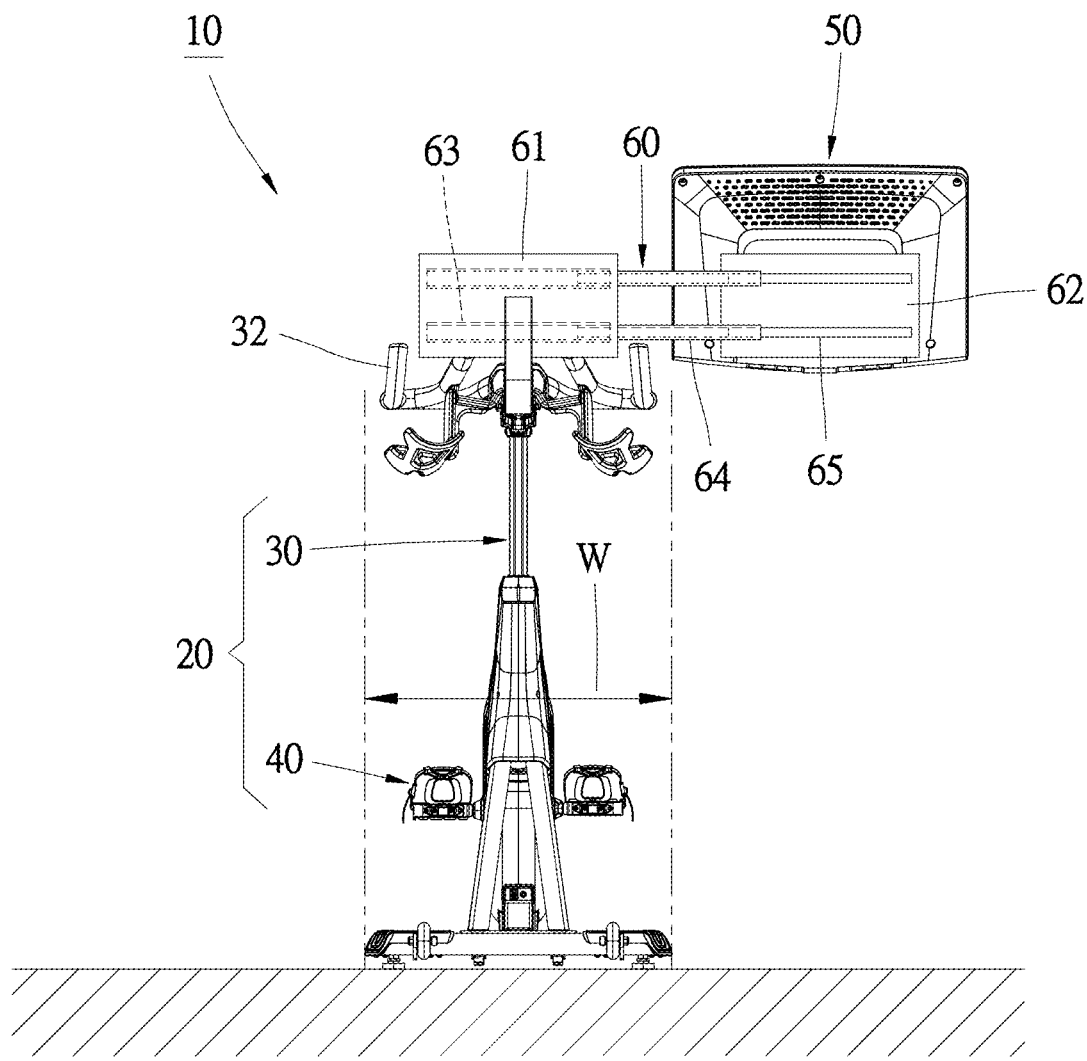
FIG. 5B is a front view of the exercise bike when the image display is located at the second position.

The image display 50 is movingly connected to a front portion of the frame 30 via a connecting component 60, the connecting component 60 might be a slide rail mechanism which is commonly used in drawers or sliding cabinets. Specifically. As shown in FIGS. 5A and 5B, a holder 61 is set on the front portion of the frame 30 and the position of the holder 61 is forward than a handle 32, and the image display 50 is located between the handle 32 and the holder 61. The back side of the image display 50 is provided with a sliding component 62, and there are two sets of three-section slide rails vertically arranged between the holder 61 and the sliding component 62. Each set of the three-section slide rail includes a first slide rail 63, a second slide rail 64 and a third slide rail 65 can extend in the left and right direction and be connected in sequence. The first slide rail 63 is fixed on the surface of holder 61, the second slide rail 64 can slide left and right on the first slide rail 63 and can extend beyond the first slide rail 63. The third slide rail 65 can slide left and right on the second slide rail 64 and extend beyond the second slide rail 64, and the third slide rail 65 is fixed on the surface of sliding component 62.

When the second slide rail 64 and the third slide rail 65 are all moved to the middle position and overlap with the first slide rail 63 through the connecting component 60, the image display 50 is located at a first position shown as the solid line in FIG. 5A. If the user pulls or pushes the image display 50 from the first position in a right or left direction, the sliding component 62 drive the third slide rail 65 to slide to the right or left direction corresponding to the second slide rail 64, the second slide rail 64 slides to the right or left direction corresponding to the first slide rail 63. When the three-section slide rail extends to the maximum length in a right or left direction, the image display 50 is located at a second position shown as the solid line in FIG. 5B. (note: FIG. 5B illustrates the second position where the image display 50 is located at the left side of the first position. And symmetrically, when the three-section slide rail extends to the maximum length in the right direction, the image display 50 is located at another second position at the right side of the first position.) If the user pulls or pushes the image display 50 from the second position to the middle position of the exercise apparatus body 20, the sliding component 62 drive the third slide rail 65 and the second slide rail 64 to slide inward until third slide rail 65 and the second slide rail 64 are overlapped to the first slide rail 63, and the image display 50 is back to the first position. Further, the two sets of three-section slide rails may include detent features to locate the image display 50 to one or more preferred positions (for example, the first position or the second position) in a normal use scenario, and the image display 50 is horizontally moved only in receiving enough external force or specific operation (such as slightly lifting).

Referring to the FIG. 4, when the image display 50 is located at the first position, the display surface 51 faces rearward and the long axis L direction of the display surface 51 corresponds to the transverse direction. The center point C of the display surface 51 is located in a region of the width in the transverse direction of the exercise apparatus body 20. In this embodiment, the center point C is located at the center of the width W, but the center point C may also be implemented being offset from the center of the width W. When the image display 50 is moved from the first position to any one of the second positions (for example, the right side or the left side of the first position), the movement distance of the center point C in the transverse direction exceeds half of the width W of the exercise apparatus body 20. And when the image display 50 is located at any one of the second positions, the center point C of the display surface 51 is located outside the region of the width in the transverse direction of the exercise apparatus body 20. That is, when the image display 50 is located at the second position on the left side of the first position, the center point C of the display surface 51 is located outside the left side edge of the exercise apparatus body 20; and when the image display device 50 is located at the second position on the right side of the first position, the center point C of the display surface 51 is located outside the right side edge of the exercise apparatus body 20.

In the embodiment, the distance of the horizontal movement of the image display 50 between the first position and any one of the second positions is substantially equal to the width W of the exercise apparatus body 20, and when the image display 50 is located at any one of the second positions (for example, the positions shown as dashed line in FIG. 4), the display surface 51 is located outside a region of the width in the transverse direction of the display surface 51 when the image display being located at the first position. Based on the horizontal movement of the image display 50 adopted in the embodiment, the display surface 51 substantially faces rearward and the long axis L direction corresponds to the transverse direction.

Figure 6:
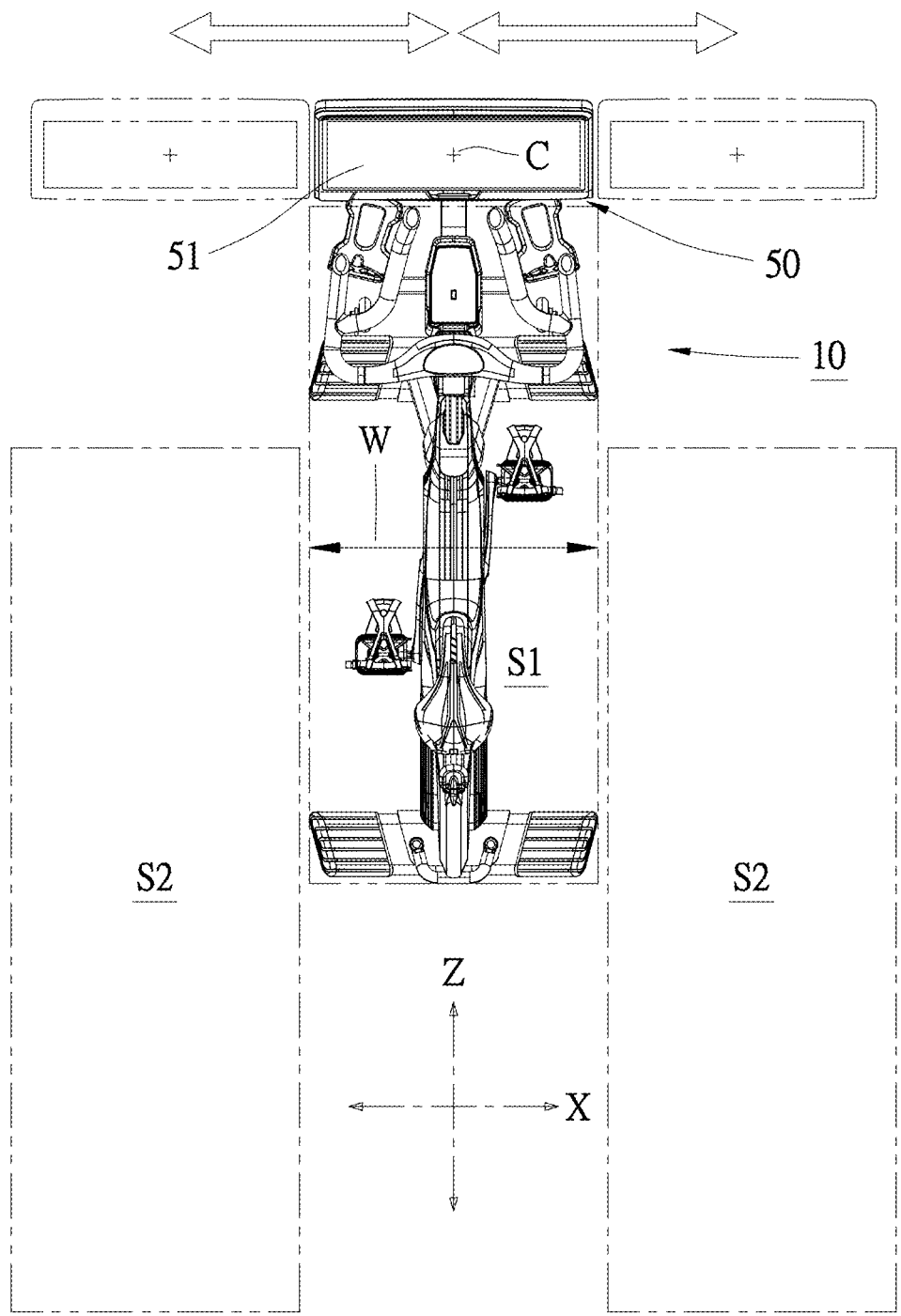
FIG. 6 is a top view of the exercise bike of FIG. 3 showing positions of the second exercise area.

Referring to FIG. 6, when a user performs the first exercise (cycling exercise) with the exercise apparatus 10 (exercise bicycle) in the first exercise area S1, the image display 50 shall be located at the first position. That is, the display surface 51 faces rearward and the long axis direction of the display surface 51 corresponds to the transverse direction X, and the center point C of the display surface 51 is located at the center of the width W of the exercise apparatus body 20. When the user faces forward to perform the first exercise in the first exercise area S1 which is positioned behind the image display 50, the user may naturally and comfortably view the image displayed on the display surface 51 (the user might be slightly lowering a head or looking down), and the image might include the first instructional image for guiding the user to perform the first exercise. When the user wants to follow the second instructional image to perform the second exercise such as stretching, yoga, light weight training, etc., the image display 50 may be moved from the first position to any one of the second positions. That is, the display surface 51 still faces rearward and the long axis direction of the display surface 51 corresponds to the transverse direction X, but the entire display surface 51 is located outside the region of the width in the transverse direction of the exercise apparatus body 20 (for example, display surface 51 is located outside the left side edge or the right side edge of the exercise apparatus body 20), and the user faces forward in a second exercise area S2 to perform the second exercise while viewing the second instructional image displayed on the display surface 51. The shape of the second exercise area S2 is generally a rectangle (also represented by the dimensions of a typical yoga mat), the long axis direction of S2 corresponds to longitudinal direction Z, and one of the long sides of the second exercise area S2 is adjacent to the corresponding side of the exercise apparatus body 20. The long side length of the second exercise area S2 is not necessarily the same as the side length of the exercise apparatus body 20. As shown in FIG. 6, the back end of the second exercise area S2 exceeds the back end of the exercise apparatus body 20, and the front end of the second exercise area S2 does not exceed the front end of the exercise apparatus body 20, so that the user performs the second exercise with a distance from the display surface 51.

Because the image display 50 can be moved from the first position to the any one of second positions, the user can move the image display 50 to a suitable position such as the left side and right side of the exercise apparatus 10 based on the space condition. For example, if the exercise apparatus 10 is placed indoors and is positioned with right side of the exercise apparatus 10 placed next to the wall, the image display 50 can be moved to the left side of the exercise apparatus 10; and if both sides of the exercise apparatus 10 are wide enough for performing the second exercise, the user can move the image display 50 to a suitable side according to user preferences.

Figure 7:
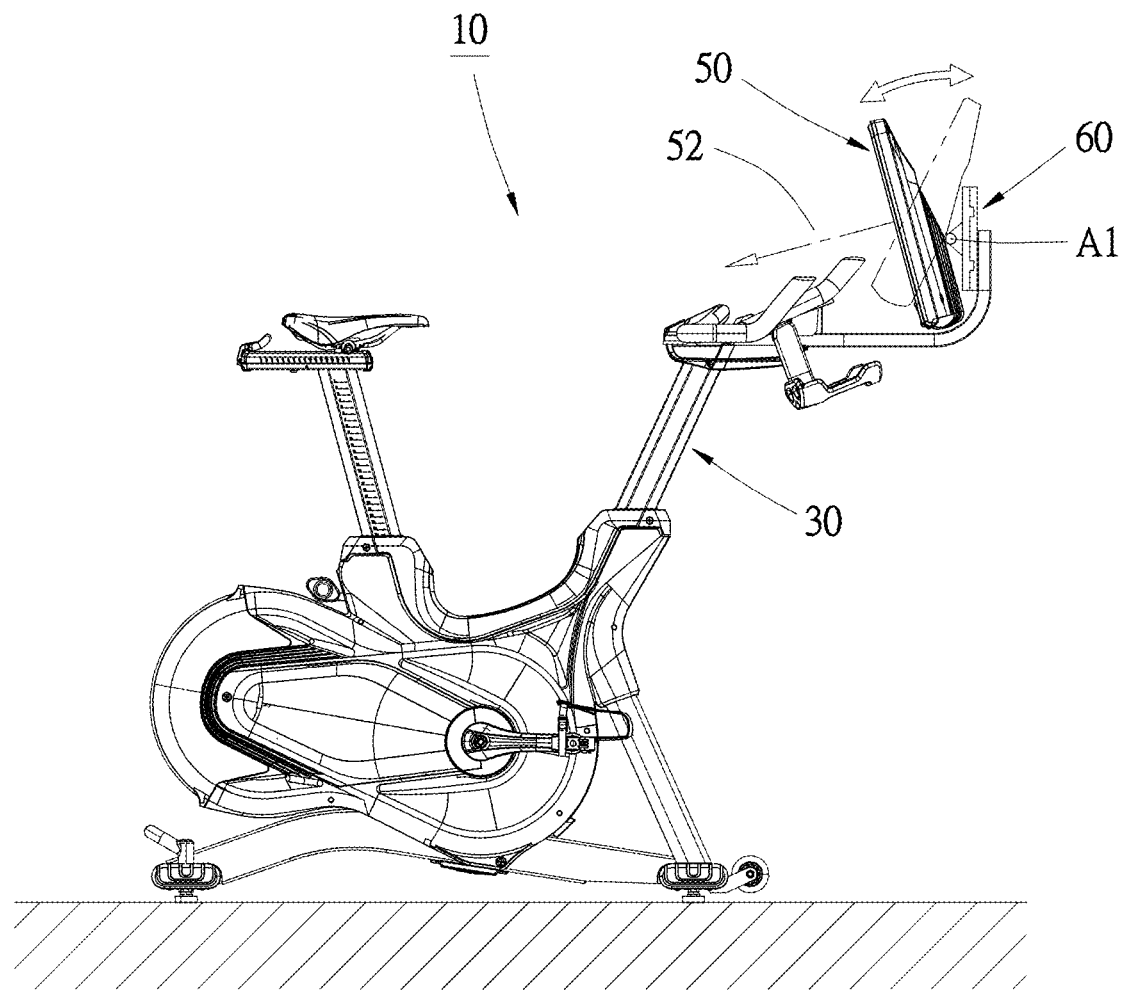
FIG. 7 is a side view of the exercise bike of FIG. 3, where the pitch angle of the image display is adjustable when the image display is located at the second position.

Referring to FIG. 7, the image display 50 can rotate within a predetermined angle range by using the sliding component 62 of the connecting component 60 about a rotation shaft A1, the rotation shaft A1 direction is corresponding to transverse direction, and the pitch angle of the display surface 51 can be fixed at any predetermined angle by using a rotation pivot or a locking mechanism (not shown). Specifically, the image display 50 may be rotated upward and downward to a proper angle about the rotation shaft A1, so the user can view the display surface 51 with the user's line of sight. The long axis L and the short axis S of the display surface 51 correspond to the transverse direction and the vertical direction respectively, and the normal line 52 of the display surface 51 corresponds substantially to the longitudinal direction Z. The image display 50 may be rotated upward and downward to maximum 30 degrees about the rotation shaft A1.

When the user performs the first exercise (cycling exercise) on the exercise apparatus 10, the display surface 51 of the display device 50 may be properly tilted upward for suitable viewing, for example, the pitch angle of the normal line 52 of the display surface 51 is 5 to 30 degrees. And when the user performs the second exercise in the second exercise area S2 which is adjacent to the exercise apparatus 10, the image display 50 is located at the second position and the pitch angle of the image display 50 can be adjusted. For example, when the user performs the second exercise of standing exercise type, the display surface 51 might face rearward and be tilted upward. And when the user performs the second exercise of floor exercise type, the display surface 51 might be tilted downward (for example, the normal line 52 to the display surface 51 may be angled downward from a horizontal plane by an angle of 5 to 30 degrees). It is to be mentioned here that the display surface 51 is facing substantially rearward when the display surface 51 tilted within 30 degrees with respect to the horizontal plane. The image display of the present invention may also be a curved display or other types of display. When a curved display is used, the "display surface facing rearward" means that the normal line 52 of the center point of the display surface 51 substantially corresponds to the longitudinal direction, and the "display surface facing substantially rearward" means that the normal line 52 of the center point of the display surface 51 substantially corresponds to the longitudinal direction (e.g., the display surface tilted within 30 degrees).

In general, exercise apparatuses such as an exercise bike or a treadmill have a length in the longitudinal direction longer than a width in the transverse direction. In the present invention, the long axis direction of the second exercise area S2 corresponds to the longitudinal direction of the exercise apparatus body 20, and one of the long sides of the second exercise area S2 is substantially parallel to and substantially adjacent to the corresponding side of the exercise apparatus body 20, therefore, the total usage area for the user performing the first exercise and the second exercise of the present invention is small, that is, a small room or a narrow space can also available for placing the exercise apparatus 10 and leave a space for the user performing the second exercise. And when the user performs the second exercise, the image display 50 is disposed at the second position, and the image display 50 and the second exercise area S2 are arranged to be aligned longitudinally, so that the user can face forward to view the image displayed on the display surface 51 in the second exercise area S2, which is more comfortable for the user.

When the user performs a second exercise that is a standing exercise type or floor exercise type in the second exercise area S2, the user can view the entire image displayed on the display surface 51 because there is no obstruction (e.g., a grip of the exercise bike) between the user and the image display 50. And the user can also operate the image display 50 without obstruction, for example, the user adjusts the pitch angle of the image display 50 or inputs commands through buttons or a touch screen. Further, when the user performs the second exercise in the second exercise area S2 and bows the user's head to view the image display 50, the user can tilt downward the image display 50 to an appropriate angle for easily viewing the instructional image.

Of course, the embodiments of the exercise apparatus having the advantages mentioned above is not limited in the FIGS. 3 to 7, and the function of the image display moved between the first position and the second position is not limited in horizontally moving the image display. A plurality of possible embodiments are listed below with respect to the movement manner of the image display. In the embodiments listed below, the connecting component between the image display and the frame of the exercise apparatus body is only briefly described, and the same or corresponding elements as those in the above-mentioned embodiment are represented by the same symbols.

Figure 8:
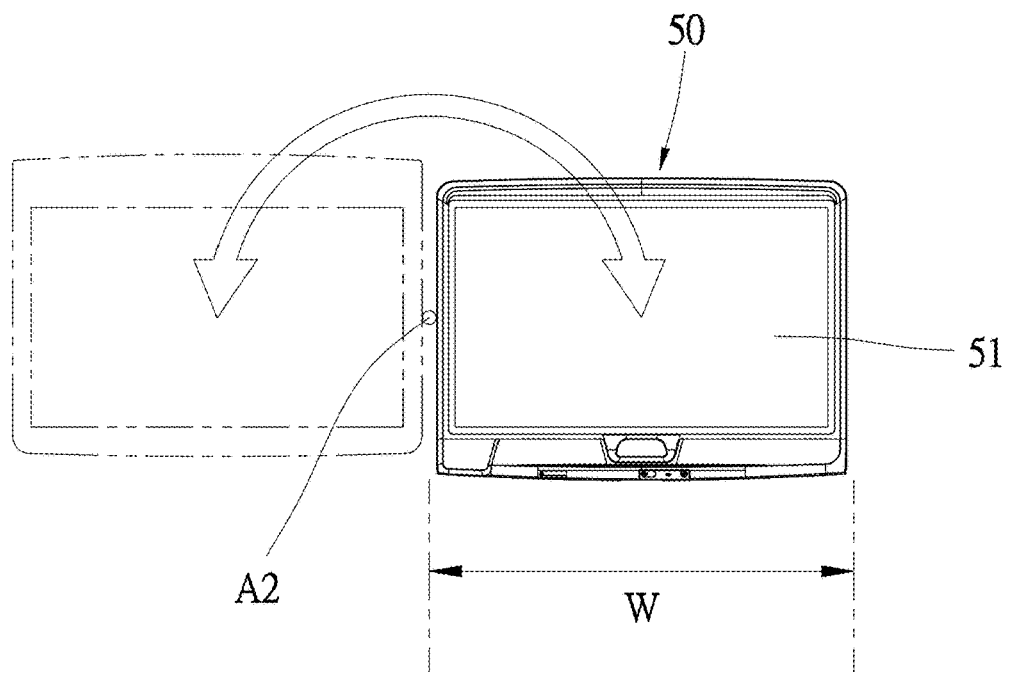
FIG. 8 illustrates an example of the image display moved between the first position and the second position.

Referring to FIG. 8, the connecting component between the image display 50 and the frame body (not shown) of the exercise apparatus body includes a rotation shaft A2 (note: FIG. 8 is the rear view of part of the exercise apparatus and the rotation shaft A2 is perpendicular to the figure surface.

Figure 9:
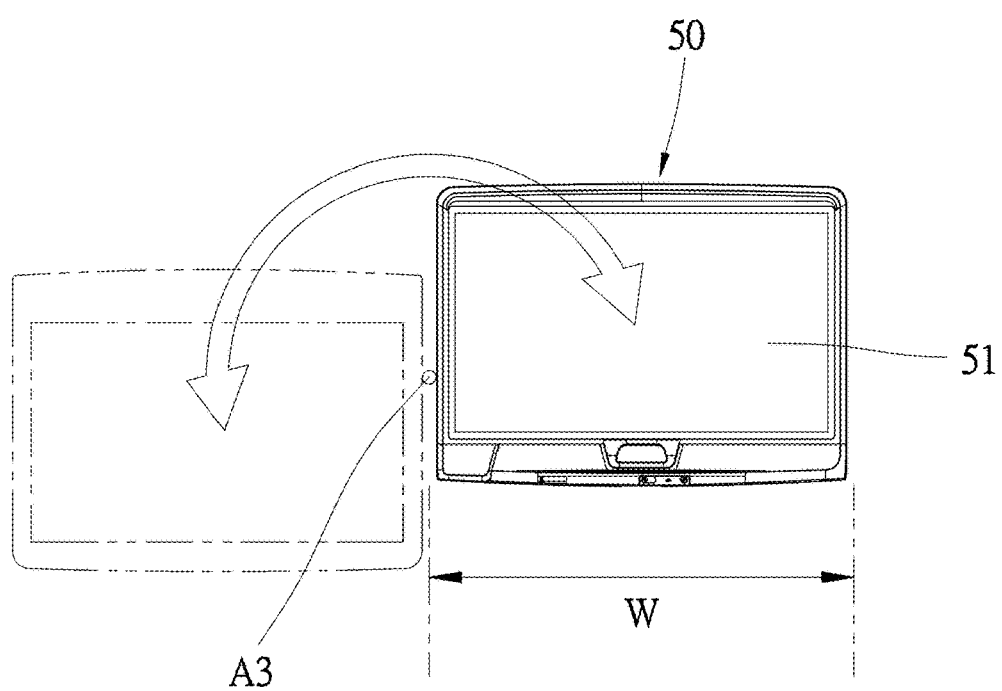
FIG. 9 illustrates another example of the image display moved between the first position and the second position.
Figure 10:
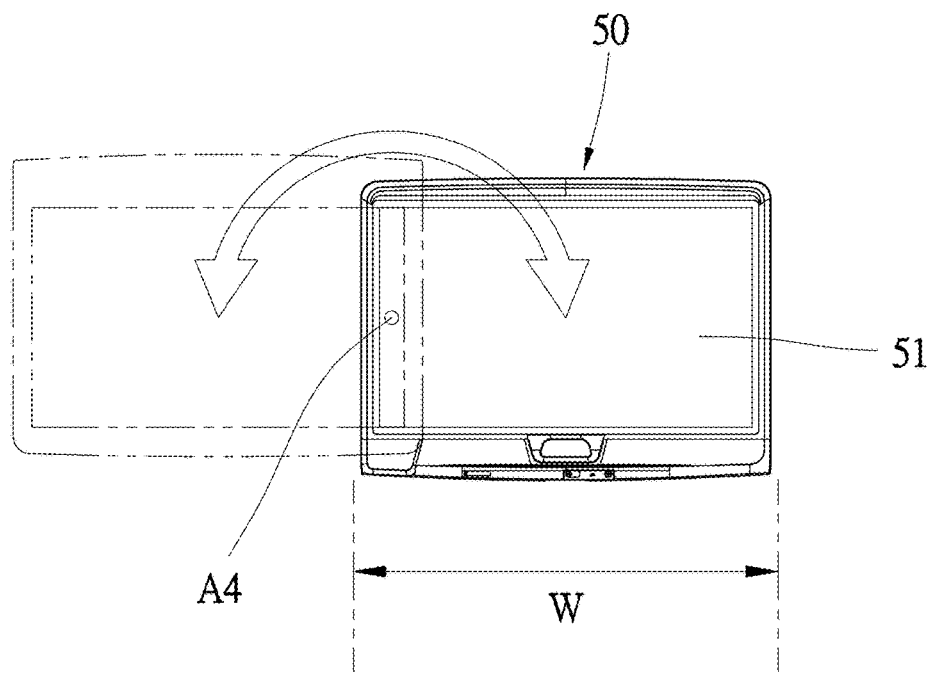
FIG. 10 illustrates another example of the image display moved between the first position and the second position.
Figure 11:
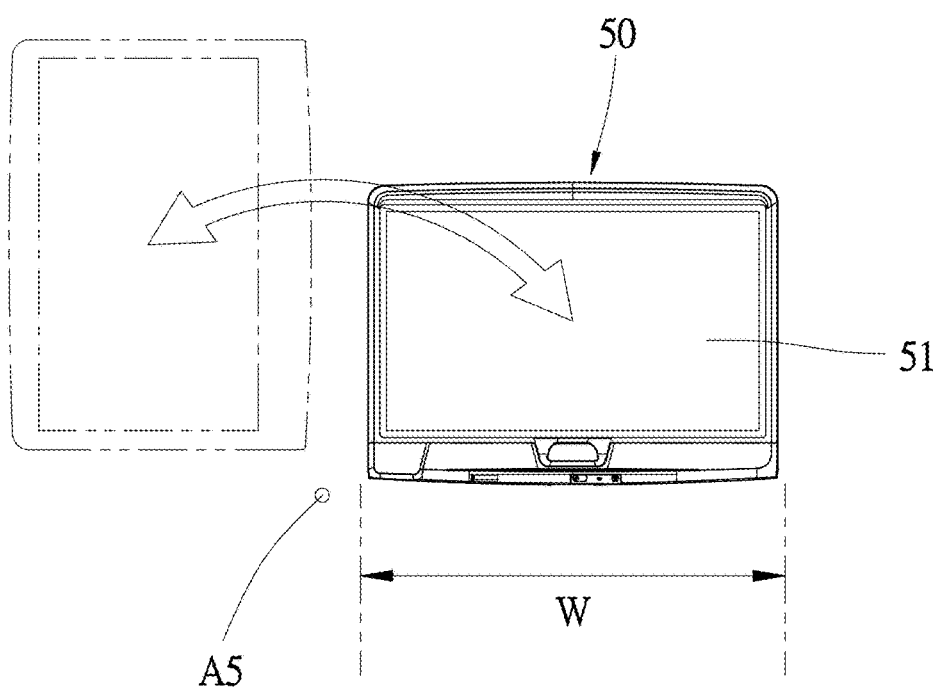
FIG. 11 illustrates another example of the image display moved between the first position and the second position.

FIGS. 9 to 11 are in the same manner as FIG. 8). The rotation shaft A2 is located on the outside of the display surface 51 (for example, the left side of the display surface 51) when the image display 50 being located at the first position shown as a solid line in FIG. 8, and the image display 50 is located at a height corresponding to the height of the center point of the display surface 51.

The movement of the image display 50 between the first position and the second position is shown as a dashed line in FIG. 8 might comprise rotating the image display 50 by 180 degrees about the rotation shaft A2. That is, the image display 50 is rotated 180 degrees counterclockwise about the rotation shaft A2 to move the image display 50 from the first position to the second position, and the image display 50 is rotated 180 degrees clockwise about the rotation shaft A2 to move the image display 50 from the second position back to the first position. The facing direction of the display surface 51 does not change during the rotation, the long axis direction of the display surface 51 corresponds to the transverse direction during the rotation, and the height of the display surface 51 relative to the floor is substantially constant, for example, the height of the center point relative to the floor is constant.

Considering that the image display 50 may have different pitch angles in the first position and the second position, it can be implemented that the back of the image display 50 is pivoted to a seat (not shown) about a pivot shaft which is parallel to the width of the display surface 51, and the seat can rotate 180 degrees relative to the exercise apparatus body about the rotation shaft A2. After the image display 50 is rotated to the second position, the pivot shaft is still corresponding to the transverse direction, so that the image display 50 can rotate within a predetermined angle range relative to the seat about the pivot shaft to adjust the pitch angle of the display surface 51.

The second position of the display surface 51 in FIG. 8 (the second position rotated by 180 degrees from the first position to the left side) and FIG. 4 (the second position horizontally moved from the first position to the left side) are the same. However, the image display 50 and the display surface 51 have both been rotated by 180 degrees about the rotation shaft A2 in FIG. 8. If the orientation of the video image is left unchanged, the image displayed to the user will be reversed both vertically and horizontally (for example, "down" is originally presented to be "up"), so it is necessary that the control unit shall orient the video image shown on the image display 50 to substantially compensate for the change in orientation of the image display 50, thereby ensuring that the user can see the image with correct orientation when the image display 50 is located at the first position or the second position.

For this purpose, a gravity sensor (not shown) may be equipped on the image display 50 for sensing the direction of the image display 50 relative to the ground and transmitting the sensed signal to the control unit, so the control unit can determine the image display 50 is located at the first position or the second position. This gravity sensor tells the control unit when the position of the image display 50 is reversed in the vertical and horizontal directions and can adjust the image orientation accordingly. Alternatively, two switches (not shown) may be disposed on the frame body of the exercise apparatus body, the image display or the connecting component for controlling the orientation of the image. That is, the one of the switches is touched when the image display 50 is located at the first position, and the other switch is touched to change the orientation of the image when the image display 50 is located at the second position.

Referring to FIG. 9, the connecting component between the image display 50 and the frame body (not shown) of the exercise apparatus body also includes a rotation shaft A3. The rotation shaft A3 direction is substantially parallel to the longitudinal direction of the exercise apparatus. The rotation shaft A3 is located on the outside of the display surface 51, for example, the rotation shaft A3 is on the left outside of the display surface when the image display device 50 is located at the first position shown as solid line in FIG. 9. The movement of the image display 50 between the first position and the second position is shown as dashed line in the FIG. 9 and involves the rotation of the image display 50 by 180 degrees about the rotation shaft A3. The difference between the FIG. 8 and FIG. 9 is that the position of the rotation shaft A3 in FIG. 9 is lower than the center point of the display surface 51 when the image display 50 is located at the first position. Therefore, when the image display 50 is rotated 180 degrees counterclockwise from the first position to the second position about the rotation shaft A3, the height of the display surface 51 becomes relatively lower. More specifically, when the image display 50 is located at the at least one second position, the height of the center point and the bottom end of the display surface 51 is lower than the height of the center point and the bottom end of the display surface 51 when the image display 50 is located at the first position (note: the "bottom ends" means the side of display surface 51 closer to the floor before rotation and after rotation). In practice, the height of user's head when the user performs the second exercise is generally lower than the height of the user's head when the user performs the first exercise, therefore, the height of the display surface 51 becoming lower is advantageous for the user viewing the image when the user performs the second exercise, and it is better if the function of adjusting the pitch angle of the display surface 51 is provided. Because the orientation of the image display 50 is changed, the control unit also orients the video image shown on the image display 50 to substantially compensate for the change in orientation of the image display 50.

Referring to FIG. 10, the connecting component between the image display 50 and the body frame (not shown) of the exercise apparatus body is a rotation shaft A4. The rotation shaft A4 direction is substantially parallel to the longitudinal direction of the exercise apparatus. The rotation shaft A4 is located relatively to one side of the display surface 51, for example, the rotation shaft A4 is located on the left inside edge of the display surface 51 when the image display device 50 is located at the first position shown as the solid line in FIG. 10. The axis of the rotation of shaft A4 crosses through the display surface 51. Therefore, when the image display 50 is rotated 180 degrees counterclockwise from the first position to the second position (shown as dashed line in FIG. 10) about the rotation shaft A4, the center point of the display surface 51 is outside the region of the width of the exercise apparatus, but part of the display surface 51 is still located in the width range of the exercise apparatus. When the image device 50 is located at the second position, the display surface 51 has a small amount of overlap with the display surface 51 when the image display 50 is located at the first position. In FIG. 10, the display surface 51 shown as solid line is partially overlapped with the display surface 51 shown as dashed line in FIG. 10. Because the orientation of the image display 50 is changed, the control unit also orients the video image shown on the image display 50 to substantially compensate for the change in orientation of the image display 50.

Referring to FIG. 11, the connecting component between the image display 50 and the body frame (not shown) of the exercise apparatus body includes a rotation shaft A5, the rotation shaft A5 direction is substantially parallel to the longitudinal direction of the exercise apparatus. The rotation shaft A5 is located on the outside of the display surface 51, for example, the rotation shaft A5 is on the left outside of the display surface when the image display device 50 is located at the first position shown as solid line in FIG. 11. The movement of the image display 50 between the first position and the second position shown as dashed line in the FIG. 11 and involves the rotation of the image display 50 rotated 90 degrees about the rotation shaft A5. That is, the image display 50 is rotated 90 degrees counterclockwise from the first position to the second position about the rotation shaft A5, and the image display 50 is rotated 90 degrees clockwise from the second position back to the first position about the rotation shaft A5. When the image display 50 is located at the first position, the long axis direction of the display surface 51 corresponds to the transverse direction and the rectangular display surface 51 is horizontally long; when the image display device 50 is located at the second position, the short axis direction of the display surface 51 corresponds to the transverse direction and the rectangular display surface 51 is vertically long. In this embodiment, when the image display 50 is located at the at least one second position, the height of the center point and the bottom end of the display surface 51 is the same as the height of the center point and the bottom end of the display surface 51 as the image display 50 being located at the first position. In a different embodiment, when the image display 50 is located at the at least one second position with properly setting the position of the rotation axis A5, the height of the bottom end of the display surface 51 is lower than the height of the bottom end of the display surface 51 when the image display 50 is located at the first position. Similarly, the control unit controls the orientation, layout and zooming of the image displayed on the display surface 51 according to the movement of the image display 50, so that the user can see the image with correct orientation when the image display 50 is located at the first position or the second position. Because the orientation of the image display 50 is changed, the control unit also orients the video image shown on the image display 50 to substantially compensate for the change in orientation of the image display 50.

Figure 12A:
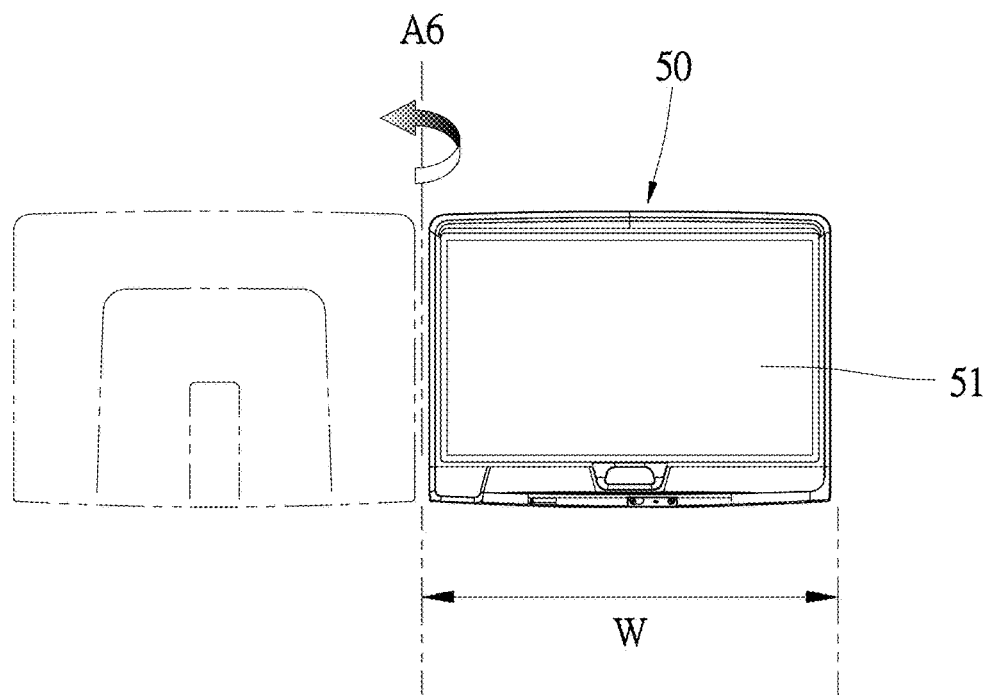
FIG. 12A to 12C illustrate other examples of the image display moved between the first position and the second position.
Figure 12B:
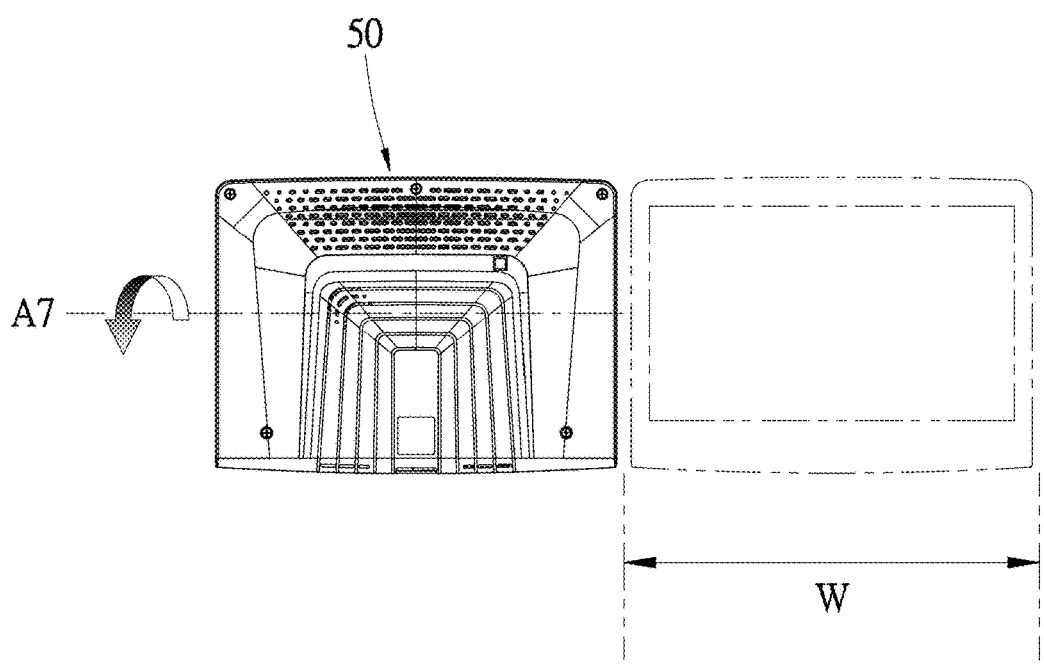
Figure 12C:
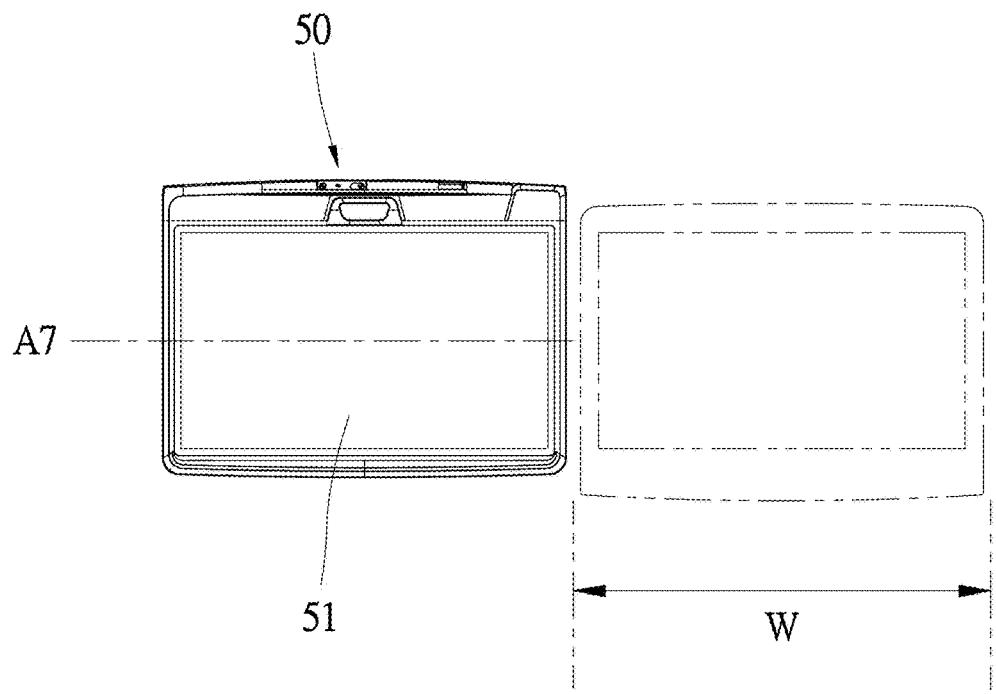

Referring to FIG. 12A to 12C, the connecting component between the image display 50 and the body frame (not shown) of the exercise apparatus body includes a vertical tilt axis A6 perpendicular to a horizontal tilt axis A7. The vertical tilt axis A6 is perpendicular to the ground or slightly inclined (for example, the axis is inclined to the front) and the vertical tilt axis A6 is located on the outside of the display surface 51. For example, the vertical tilt axis A6 is on the left outside of the display surface 51 when the image display device 50 is located at the first position shown as solid line in FIG. 12A to 12C. The horizontal tilt axis A7 is parallel to the long axis of the display surface 51 and is at a height corresponding to the height of the center point of the display surface 51. The movement of the image display 50 between the first position and the second position shown as solid line in the FIG. 12C comprises rotated 180 degrees about the vertical tilt axis A6 and rotated 180 degrees about the horizontal tilt axis A7. For example, when the user wants to move the image display 50 from the first position to the second position, the image display 50 may be rotated 180 degrees about the vertical tilt axis A6 (as the movement in FIG. 12A to 12B), that is, the image display 50 is rotated from the right side of the vertical tilt axis A6 to the left side of the vertical tilt axis A6, and the display surface 51 temporarily faces forward. Then the user rotates the image display 50 180 degrees about the horizontal tilt axis A7 (as the movement in FIG. 12B to 12C), and the display surface 51 faces rearward again. In a different embodiment, the image display 50 is rotated 180 degrees about the horizontal tilt axis A7 from the first position first and the image display 50 is rotated 180 degrees about the vertical tilt axis A6 to the second position. The image display 50 can also be rotated about the horizontal tilt axis A7 to adjust the tilting angle of the display surface 51. Since the movement of the image display 50 from the first position to the second position in the above manner also make the image display 50 reversed in the vertical and horizontal directions, the control unit also controls the orientation of the image according to the movement of the image display 50 between the first position and the second position.

Figure 13:
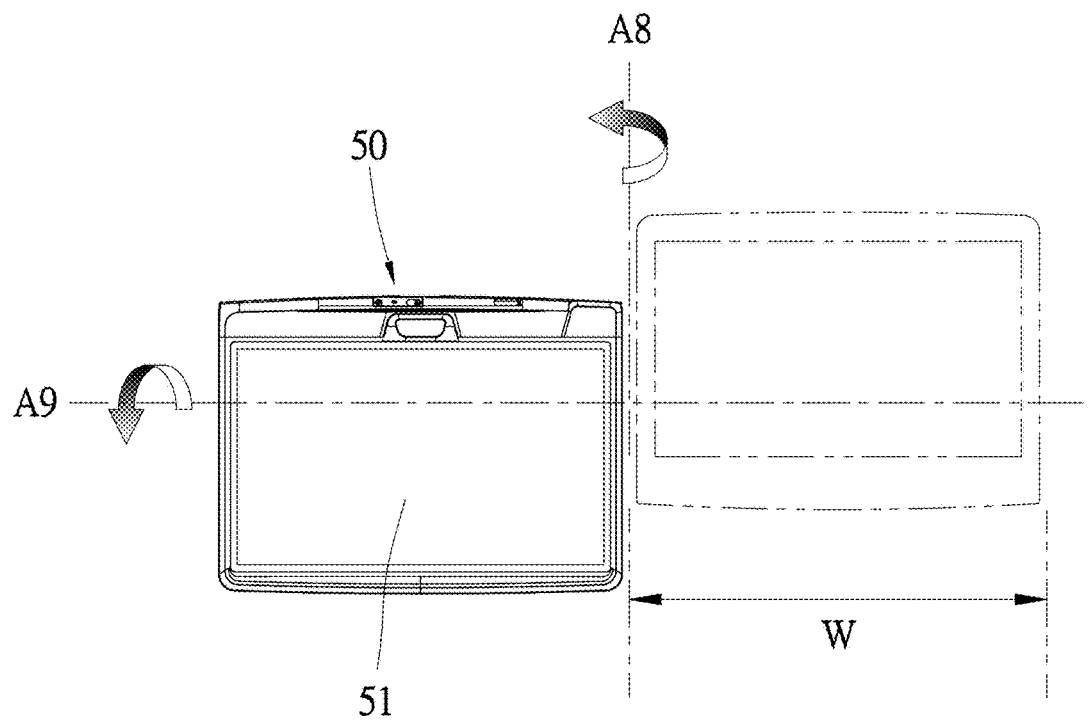
FIG. 13 illustrates another example of the image display moved between the first position and the second position.

The embodiment in FIG. 13 is similar to the embodiment shown in FIG. 12A to 12C, that is, the movement of the image display 50 between the first position (shown as dashed line in FIG. 13) and the second position (shown as solid line in FIG. 13) rotates the image display 50 by 180 degrees about the vertical tilt axis A8 and rotates the image display 50 by 180 degrees about the horizontal tilt axis A9. The difference between of FIG. 12A to 12C and FIG. 13 is that the position of the horizontal tilt axis A9 is lower than the horizontal tilt axis A7, so that when the image display 50 is rotated from the first position to the second position, the height of the display surface 51 relative to the floor in FIG. 13 is lower than the height of the display surface 51 in FIG. 12A to 12C. Because the orientation of the image display 50 is changed, the control unit also orients the video image shown on the image display 50 to substantially compensate for the change in orientation of the image display 50.

Figure 14:
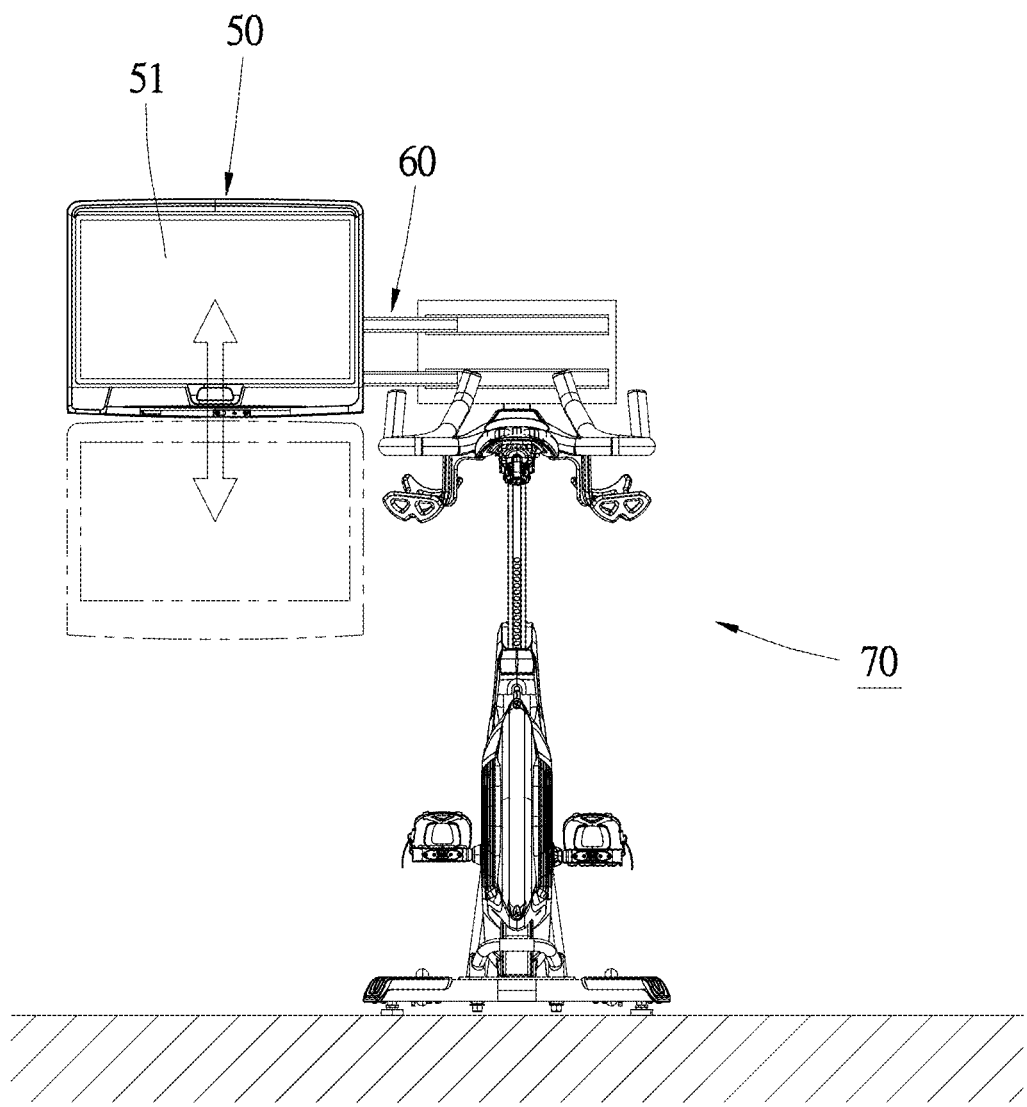
FIG. 14 is a back view of the exercise apparatus (exercise bike) of another preferred embodiment of the present invention, where the height of the image display is adjustable when the image display is located at the second position.

FIG. 14 is a back view of another preferred embodiment of the exercise apparatus 70 (exercise bicycle), and the image display 50 can be horizontally slid between the first position and the second position by the connecting component 60 (as shown in FIG. 5B). The user can adjust the height of the image display 50 when it is located at the second position, and when the image display 50 is adjusted to the lowest position (shown as dashed line in FIG. 14), the height of the bottom end of the image display 50 is lower than the height of the bottom end when the image display 50 is located at the first position. When the image display 50 is located at the second position, the user can appropriately adjust the height of image display 50 according to the height of the line of sight, for example, the image display 50 can be adjusted to a higher height when the user performs the second exercise of standing exercise type, and the image display 50 can be adjusted to a lower height when the user performs second exercise of floor exercise type. The height adjusting mechanisms of the image display 50 can be implemented in various manners, for example, the height adjusting mechanism commonly used for adjusting the height of a seat or a handle of an exercise bicycle can be directly adopted, and in addition, various computer screen supports with adjusting screen height can also be used.

Figure 15:
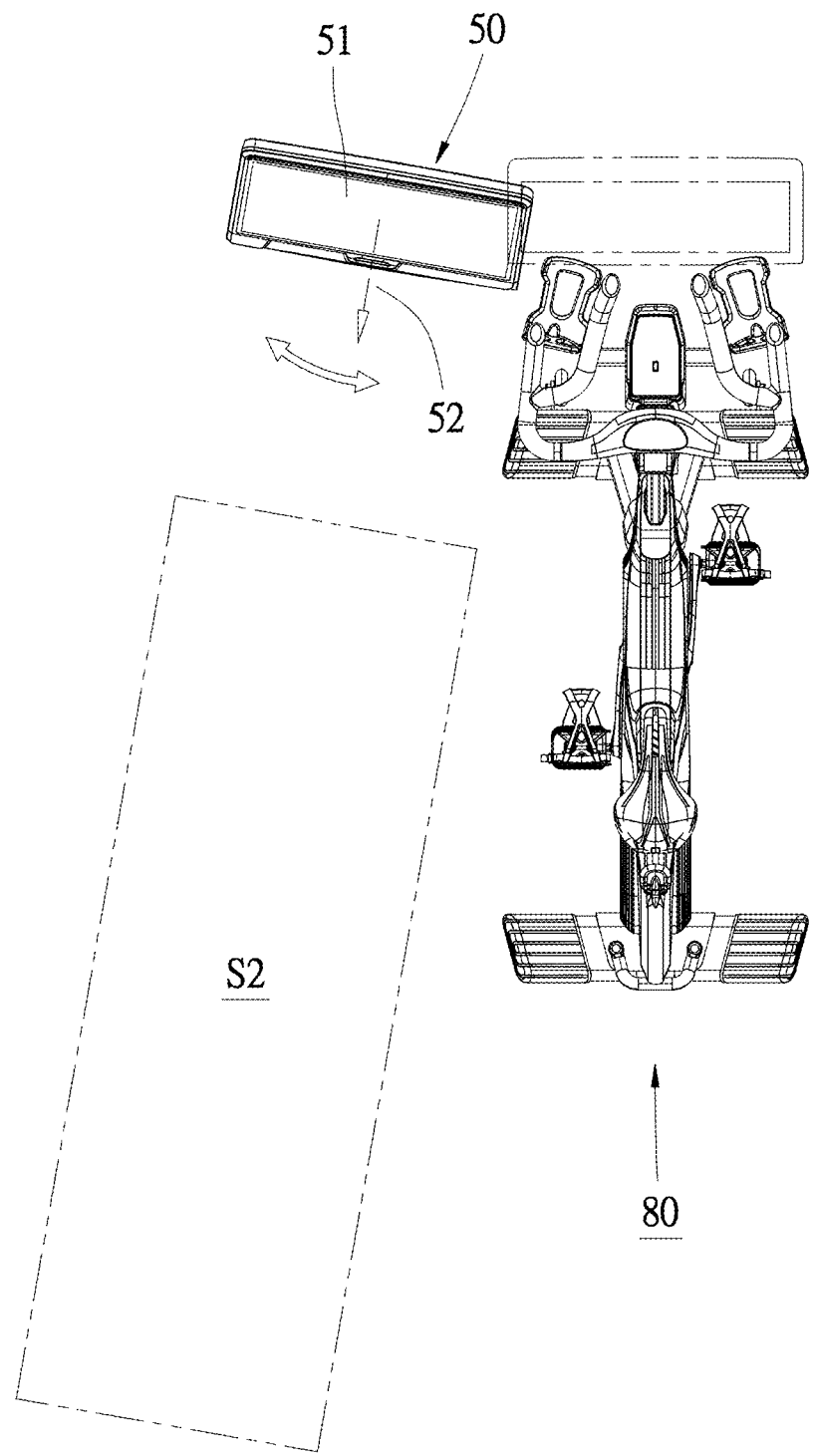
FIG. 15 is a top view of the exercise apparatus (exercise bike) of another preferred embodiment of the present invention, where the angle between the image display and the exercise apparatus is adjustable when the image display is located at the second position.

FIG. 15 is a top view of an exercise apparatus 80 (exercise bike) according to another preferred embodiment of the present invention. The user can adjust the rearward angle of the image display 50 when the image display 50 is at the second position, for example, the image display 50 can horizontally rotate about a rotation axis (not shown), where the rotation axis is a substantially vertical axis. The display surface 51 can be rotated to face obliquely rearward (facing left rearward in this embodiment of the exercise apparatus 80), so that the normal line 52 of the display surface 51 forms an angle with the longitudinal direction of the exercise apparatus body. In general, the display surface is facing substantially rearward when the angle formed by the normal line 52 of the display surface 51 with the longitudinal direction of the exercise apparatus body is within 30 degrees. If exercise space is wide enough, as shown in FIG. 15, the user can adjust the image display 50 to make the display surface 51 appropriately obliquely rearward (shown as the solid line of FIG. 15), and correspondingly, the long axis of the second exercise area S2 is also angled relative to the exercise apparatus 80, thereby reducing the possibility of collision with the exercise apparatus 80 when the user performs the second exercise.

Figure 16:
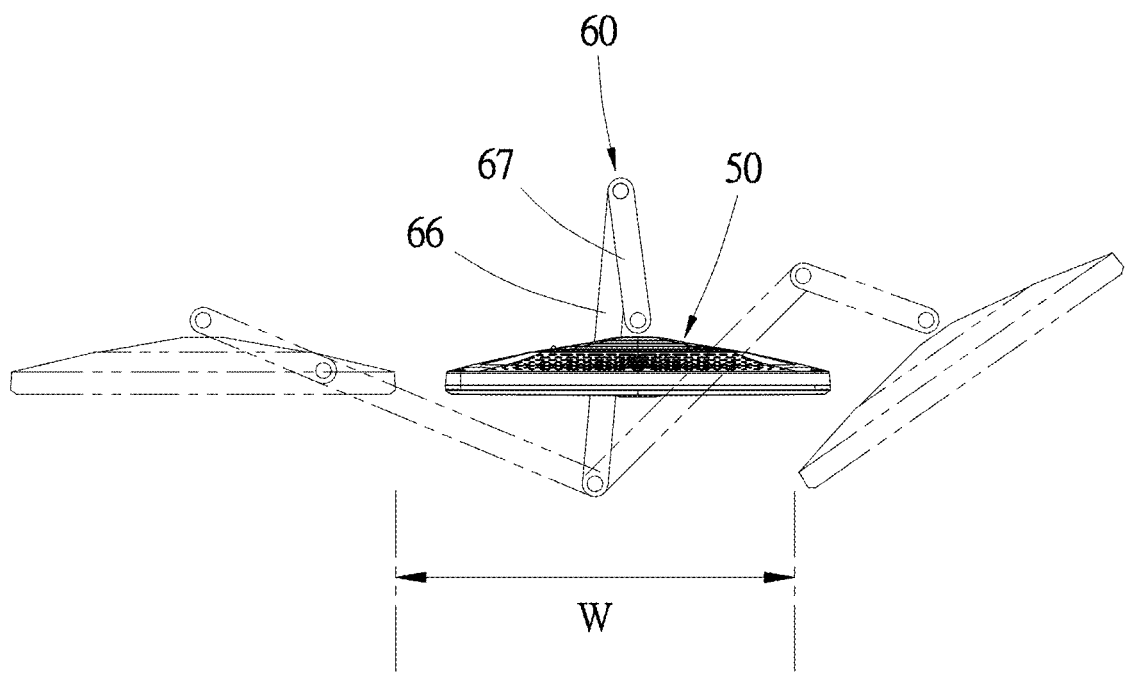
FIG. 16 illustrates another example of the image display movement using connecting rods.

FIG. 16 is a top view of part of the exercise apparatus according to another preferred embodiment of the present invention, the connecting component 60 between the image display 50 and the body frame (not shown) of the exercise apparatus body includes a first connecting rod 66 and a second connecting rod 67, a first end of the first connecting rod 66 is pivotally connected to the body frame (not shown) of the exercise apparatus body, and a first end of the second connecting rod 67 is pivotally connected to a second end of the first connecting rod 66. A back portion of the image display 50 is pivotally connected to a second end of the second connecting rod 67. The image display 50 can be moved between a first position and a second position by the connecting structure 60 in right or left direction, and the rearward angle of the image display 50 can be adjusted as required.

Figure 17:
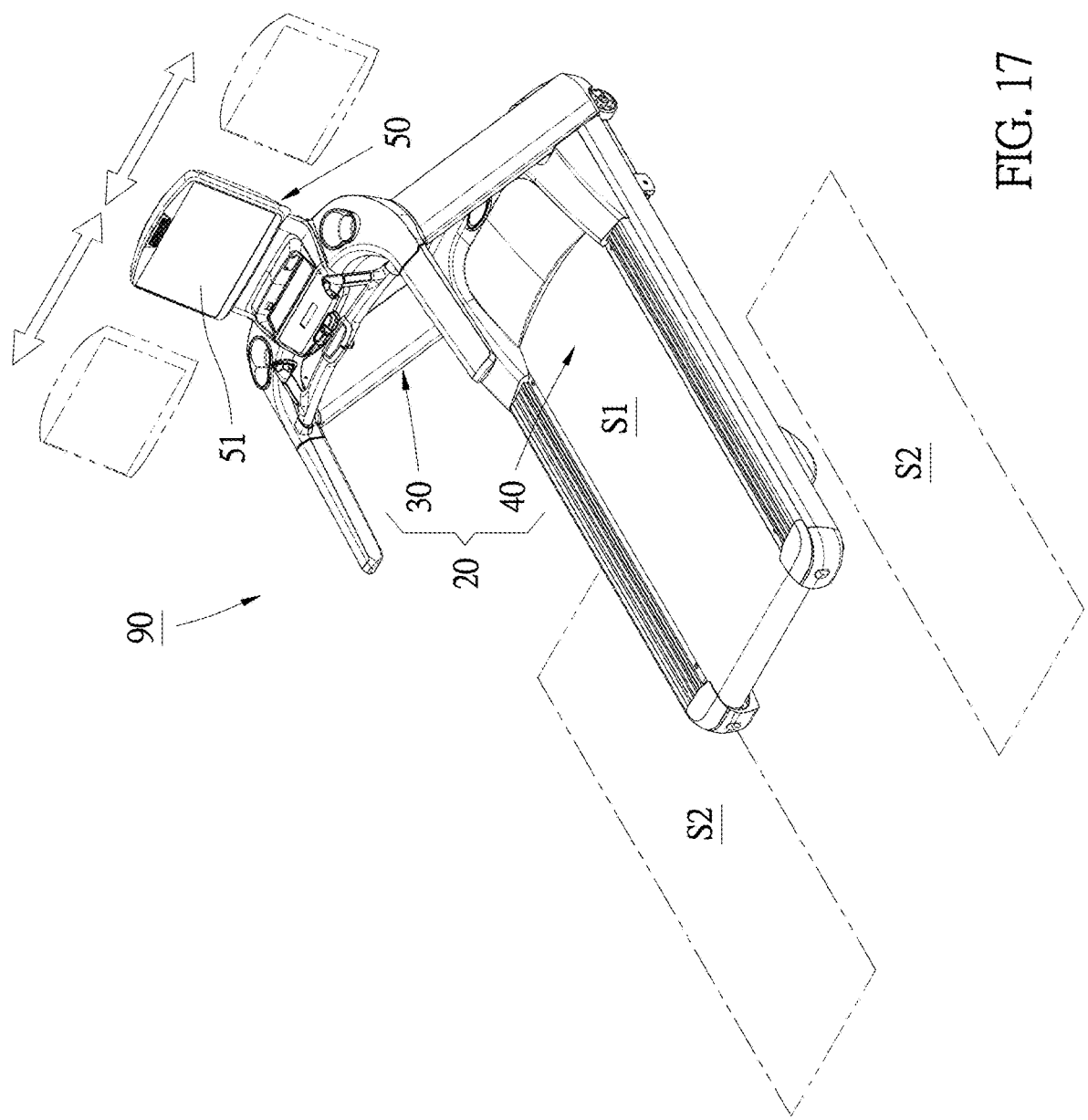
FIG. 17 is another perspective view of the exercise apparatus (treadmill) of the preferred embodiment of the present invention, where the image display is moved between a first position and a second position.

The exercise apparatus can be various type of exercise equipment such as exercise bikes, treadmills, steppers, staircases, elliptical machines, rowing machines, weight trainers, etc. Referring to FIG. 17, taking a treadmill as an example, the exercise apparatus (treadmill) 90 of the present invention has an exercise apparatus body (treadmill body) 20, the exercise apparatus body 20 has a frame body 30 and an exercise mechanism (tread belt) 40 which is movably arranged on the frame body 30. The user can face forward to perform the first exercise (running exercise) on the exercise apparatus body 20. The technical content and technical effects of the image display 50 disclosed in the above-mentioned description are also applicable to other type of exercise apparatus. In brief overview, when a user wants to perform the second exercise such as a stretching, a yoga exercise, a light weight training, etc., the image display 50 may be moved from a first position to the second position (shown as dashed line in FIG. 17), the user faces forward in the second exercise area S2 to perform the second exercise while viewing the second instructional image displayed on the display surface 51. Because the second exercise area S2 is adjacent to the exercise apparatus body 20, the total exercise space is small. The type of exercise equipment and exercise types are generally known in the art or at least do not fall within the scope of the present invention, and are not illustrated and described in detail herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An exercise apparatus, comprising:
    an exercise apparatus body having a frame and a moving mechanism movably arranged at the frame, the exercise apparatus defining a transverse direction and a longitudinal direction for a user facing forward to perform a first exercise by using the moving mechanism in a first exercise area which is located within an area of width in the transverse direction and length in the longitudinal direction of the exercise apparatus body;
    an image display having a display surface for showing a video image, the image display movably connected to a front portion of the frame via a connecting component; wherein when the display surface is located at a first position, the display surface faces rearward and a center point of the display surface is located in a region of the width in the transverse direction of the exercise apparatus body for the user viewing the video image to perform the first exercise in the first exercise area;
    a control unit operatively connected to the image display, the control unit configured to control content displayed by the image display, the content comprising a first instructional image for guiding the user to perform the first exercise in the first exercise area and a second instructional image for guiding the user to perform a second exercise in a second exercise area which is adjacent to the exercise apparatus body; and
    wherein the image display is operable to be moved between the first position and at least one second position via the connecting component, the at least one second position is located to the left side or right side of the first position; and when the image display is moved from the first position to the at least one second position, the movement distance of the center point in the transverse direction exceeds half of the width in the transverse direction of the exercise apparatus body; and when the image display is located at the at least one second position, the display surface faces rearward and the center point of the display surface is located outside the region of the width of the exercise apparatus body for the user viewing the video image to perform the second exercise in the second exercise area.

2. The exercise apparatus according to claim 1, wherein when the image display is moved from the first position to the at least one second position which is on the left side of the image display, the center point of the display surface is located outside the left side edge of exercise apparatus body; and when the image display is moved from the first position to the at least one second position which is on the right side of the image display, the center point of the display surface is located outside the right side edge of exercise apparatus body.

3. The exercise apparatus according to claim 1, wherein when the image display is located at the at least one second position, the entire display surface is located outside the region of the width in the transverse direction of the exercise apparatus body.

4. The exercise apparatus according to claim 1, wherein when the image display is located at the at least one second position, the entire display surface is located outside a region of the width of the display surface when the image display is located at the first position.

5. The exercise apparatus according to claim 4, wherein the display surface comprises a long axis direction perpendicular to a short axis direction; wherein when the image display is located at the at least one second position, the long axis direction of the display surface corresponds to the transverse direction of the exercise apparatus body, the length of the exercise apparatus body in the longitudinal direction is longer than the width of the exercise apparatus body in the transverse direction, the shape of the second exercise area is a rectangle and the length axis direction of the rectangle is substantially parallel to the longitudinal direction of the exercise apparatus body, and one of the long sides of the rectangle is substantially adjacent to one side of the exercise apparatus body.

6. The exercise apparatus according to claim 1, wherein when the image display is located at the at least one second position, the height of the bottom end of the display surface is lower than the bottom end of the display surface when the image display is located at the first position.

7. The exercise apparatus according to claim 1, wherein when the image display is located at the at least one second position, the height of the image display is adjustable; and when the height of the image display is adjusted to the lowest height, the height of the bottom end of the display surface is lower than the bottom end of the display surface when the image display is located at the first position.

8. The exercise apparatus according to claim 1, wherein when the image display is located at the at least one second position, a pitch angle of the image display is adjustable and a normal line of the display surface is angled downward from a horizontal plane by at least 5 degrees.

9. The exercise apparatus according to claim 1, wherein the connecting component comprises a rotation shaft and the rotation shaft axis is substantially parallel to the longitudinal direction of the exercise apparatus, the image display movable between the first position and the at least one second position which comprises rotation of the image display by 90 degrees or 180 degrees according to the orientation of the rotation shaft; and the control unit orients the video image shown on the image display to substantially compensate for the change in orientation of the image display.

10. The exercise apparatus according to claim 1, wherein the connecting component comprises a vertical tilt axis perpendicular to a horizontal tilt axis, the image display movable between the first position and the at least one second position, wherein movement of the image display between the first position and the at least one second position involves rotation of the image display by 180 degrees about the vertical tilt axis and rotation of the image display by 180 degrees about to the horizontal tilt axis; and the control unit orients the video image shown on the image display to substantially compensate for the change in orientation of the image display.

* * * * *